United States Patent

Huang (10) Patent No.: US 9,971,465 B2
(45) Date of Patent: *May 15, 2018

(54) MUTUAL CAPACITIVE TOUCH PANEL (71) Applicant: Shanghai Tianma Micro-Electronics Co., Ltd., Shanghai (CN)

(72) Inventor: Zhongshou Huang, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 73 days.

This patent is subject to a terminal disclaimer.

(21) Appl. No.: 15/098,218

(22) Filed: Apr. 13, 2016

(65) Prior Publication Data

US 2016/0224164 A1 Aug. 4, 2016

Related U.S. Application Data (63) Continuation-in-part of application No. 14/347,232, filed as application No. PCT/CN2012/084199 on Nov. 7, 2012, now Pat. No. 9,354,758.

(30) Foreign Application Priority Data

Aug. 23, 2012 (CN) .......................... 2012 1 0303977

(51) Int. Cl.
G06F 3/044 (2006.01)
G06F 3/041 (2006.01)

(52) U.S. Cl.
CPC ............ G06F 3/044 (2013.01); G06F 3/0416 (2013.01)

(58) Field of Classification Search
CPC ........ G06F 3/044; G06F 3/0416; G06F 3/041; G06F 3/0418; G06F 3/04112; G06F 3/0411; G06F 2203/04107; G02F 1/338
See application file for complete search history.

(56) References Cited

U.S. PATENT DOCUMENTS

2009/0009483 A1* 1/2009 Hotelling .............. G06F 3/0416
345/173
2010/0321315 A1* 12/2010 Oda ....................... G06F 3/044
345/173

(Continued)

FOREIGN PATENT DOCUMENTS

EP 2486475 A1 8/2012
WO 2011043906 A1 4/2011

OTHER PUBLICATIONS

European Office Action dated Feb. 8, 2018.

Primary Examiner — Md Saiful A Siddiqui
(74) Attorney, Agent, or Firm — Alston & Bird LLP (57) ABSTRACT The present invention provides a mutual capacitive touch panel, including: a plurality of driving lines; a plurality of sensing lines intersecting with the plurality of driving lines; a signal output unit disposed at input ends of the driving lines is configured to simultaneously output driving signals with different frequencies to all the driving lines; a preamplifier disposed at output ends of the sensing lines is configured to capture sensing signals from the sensing lines, and amplify the sensing signals and then output the amplified sensing signals to a signal separation unit; the signal separation unit connected to the preamplifier is configured to separate the sensing signals with different frequencies and obtain addresses of the driving lines corresponding to the sensing signals. The signal output unit determines the frequency sequence of the driving signals every the first predetermined time interval based on the hopping rule, and changes the frequency of the driving signal of each of the columns of the driving lines based on the determined frequency sequence.

13 Claims, 5 Drawing Sheets (56) References Cited

U.S. PATENT DOCUMENTS

| | | | | |
|---|---|---|---|---|
| 2011/0084857 A1* | 4/2011 | Marino | ............ | G06F 3/044 341/5 |
| 2011/0298737 A1* | 12/2011 | Maeda | ............ | G06F 3/044 345/173 |
| 2013/0194225 A1* | 8/2013 | Shen | ............ | G06F 3/0416 345/174 |
| 2013/0257756 A1* | 10/2013 | Chang | ............ | G06F 3/0418 345/173 |

* cited by examiner

MUTUAL CAPACITIVE TOUCH PANEL

CROSS-REFERENCES TO RELATED APPLICATIONS

This patent application is a continuation-in-part of U.S. patent application Ser. No. 14/347,232, filed Mar. 25, 2014, which is a U.S. National Stage Application filed under § 371 of PCT/CN2012/084199, filed Nov. 7, 2012, and entitled "MUTUAL CAPACITIVE TOUCH SCREEN", which claims the benefit of Chinese Patent Application No. 201210303977.1, filed Aug. 23, 2012 and entitled "MUTUAL CAPACITIVE TOUCH SCREEN", the contents of which are incorporated herein by reference in their entirety.

TECHNICAL FIELD

The present invention relates to the field of touch screen technologies, in particular to a mutual capacitive touch panel.

BACKGROUND OF THE INVENTION

Depending on sensing signal detecting modes of capacitive touch panels, the capacitive touch panels include self capacitive touch panels and mutual capacitive touch panels.

Figure 1:
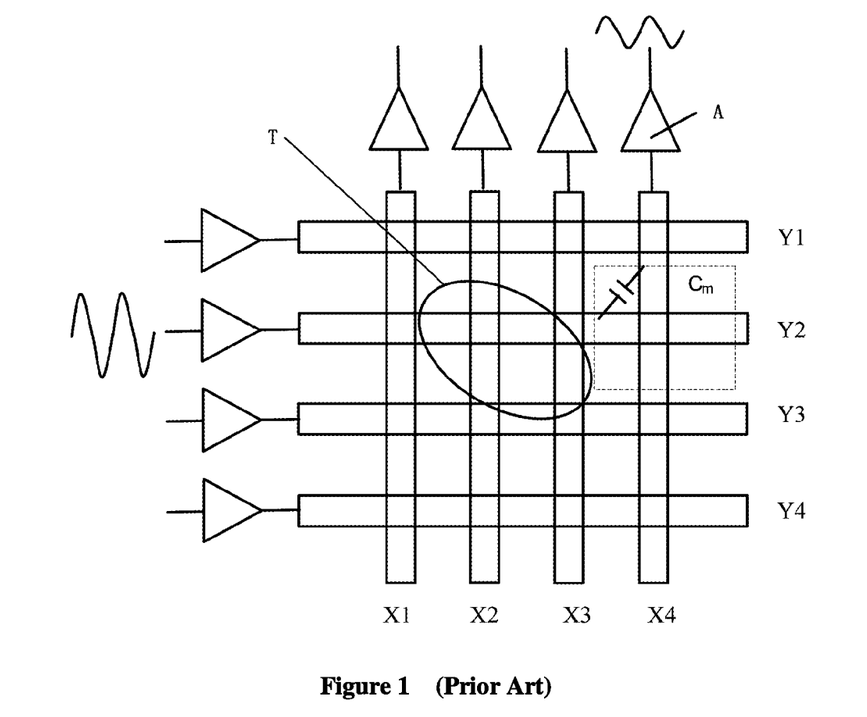
FIG. 1 is a circuit diagram showing the typical mutual capacitive touch panel in the prior art.

As shown in FIG. 1, a mutual capacitive touch panel contains a plurality of driving lines (for example Y1 to Y4) and a plurality of sensing lines (for example X1 to X4) intersecting with the driving lines. A sub-pixel of the touch panel is surrounded by a dashed box. A capacitance caused by the overlapping portions of the driving line and the sensing line will not be influenced by an external touching object, but will cause a steady background noise or a Direct Current (DC) component inputted to a preamplifier A. However, a mutual capacitance Cm that is formed by a spatial fringe electric field generated between the non-overlapped portions of electrodes of the driving lines and the sensing lines will be influenced directly by the external touching objects.

An equivalent circuit of a typical mutual capacitive touch panel as shown in FIG. 1 works in principle as described simply as follows: driving signals with a specific frequency are inputted one by one through ends of the driving lines, and signals with the same frequency induced by the mutual capacitance Cm between the driving lines and the sensing lines are received and amplified by the preamplifier A connected to ends of the sensing lines. When the surface of the touch panel is touched by a finger of a user, parasitic capacitances are formed between the finger and the driving lines and between the finger and the sensing lines. A portion of the signals will be directly leaked to the ground through the user's body or the grounded object via the parasitic capacitance, thus the signals received by the preamplifier A are previously attenuated. Depending on the design for the electrode of the touch panel, the driving frequency and the distance between the user's finger and the electrode of the touch panel, the driving signals might be coupled from the driving lines to the sensing lines through a medium such as the user's finger, thereby the signals received by the preamplifiers A are increased. In both signal induction modes, a specific position touched by the finger T can be easily found out by detecting the signal changes in the sensing lines one by one.

In the prior art, driving signals with a specific frequency are inputted one by one to the input ends of the driving lines. When a finger touches the touch panel, the mutual capacitance between the driving line and the sensing line is changed so that the amplitude of the signal of the specific frequency received from the sensing line by a detection device is varied accordingly. Each of such driving signals of a specific frequency is necessarily inputted to each of the driving lines, that is, the driving lines are scanned by specific pulse signals. According to this method in the prior art, the circuitry becomes very complicated and costly in the case of a large number of the driving lines or the high-speed detection.

BRIEF SUMMARY OF THE INVENTION

The embodiments of the present invention provide a mutual capacitive touch panel, in which all the driving lines are synchronously driven for high-speed driving, and the circuitry is simple, to reduce the cost of the entire touch panel and improve the response uniformity of the output signals of the mutual capacitive touch panel when being touched.

Embodiments of the present invention provide a mutual capacitive touch panel, including: a plurality of driving lines; a plurality of sensing lines intersecting with the plurality of driving lines; at least one preamplifier; a signal output unit; and a signal separation unit.

In the touch panel, the signal output unit is disposed at input ends of the driving lines and is configured to simultaneously output driving signals with different frequencies to all the driving lines.

In the touch panel, the preamplifier is disposed at output ends of the sensing lines and is configured to capture sensing signals from the sensing lines, and amplify the sensing signals and output the amplified sensing signals to the signal separation unit.

In the touch panel, the signal separation unit is connected to the preamplifier and is configured to separate the sensing signals with different frequencies and obtain addresses of the driving lines corresponding to the sensing signals.

In the touch panel, the signal output unit determines the frequency sequence of the driving signals every the first predetermined time interval based on the hopping rule, and changes (i.e., hops) the frequency of the driving signal of each of the columns of the driving lines based on the frequency sequence.

The present invention has the following advantages as compared with the prior art.

In the mutual capacitive touch panel provided in the present invention, driving signals with different frequencies are outputted by the signal output unit to each of the driving lines respectively, instead of driving signals with a specific frequency are outputted to the input ends of the driving lines one by one in the prior art. In the case of a large number of driving lines, the driving signals with different frequencies are sent to different driving lines simultaneously by the signal output unit in the present invention. However, the driving signals are sent one by one in the prior art, which causes not only time delays but also complicated control, because the driving lines are required to be connected and conducted one by one to send the driving signals. The touch panel provided in the present invention has simple circuitry and is convenient to control. Furthermore, the frequency sequence of the driving signals is determined every the first predetermined time interval based on the hopping rule, and the frequency of the driving signal of each of the columns of the driving lines is changed based on the frequency sequence, so that the frequency difference of the driving signal on driving lines is averaged, in order to improve the response uniformity of the output signals of the mutual capacitive touch panel when being touched.

DETAILED DESCRIPTION OF THE PREFERRED EMBODIMENTS

The embodiments of the present invention are further described in conjunction with the accompanying drawings so as to make the objects, characteristics and advantages of the present invention more apparent.

In order to reduce the complexity of the circuitry and the cost, driving signals with different frequencies may be inputted to different driving lines simultaneously. After performing a primary amplification on all the output signals with frequencies, the detection device separates the amplified output signals with different frequencies using the narrowband divider, and the address of the driving line corresponding to the each of the driving signals is determined automatically based on the frequency of the driving signal, and then the touch position is analyzed based on the amplitude of the attenuated signal or enhanced signal. When the touch panel is relatively large, the number of driving lines and sensing lines would increases accordingly, and therefore it is necessary to synchronously input driving signals with different frequencies to the large number of driving lines, leading to widen the frequency domain. However, due to a big difference between the frequencies of the driving signals on the driving lines, a big difference between the output signals occurs, so that responses of the signal of the touch panel are not uniform.

Figure 2:
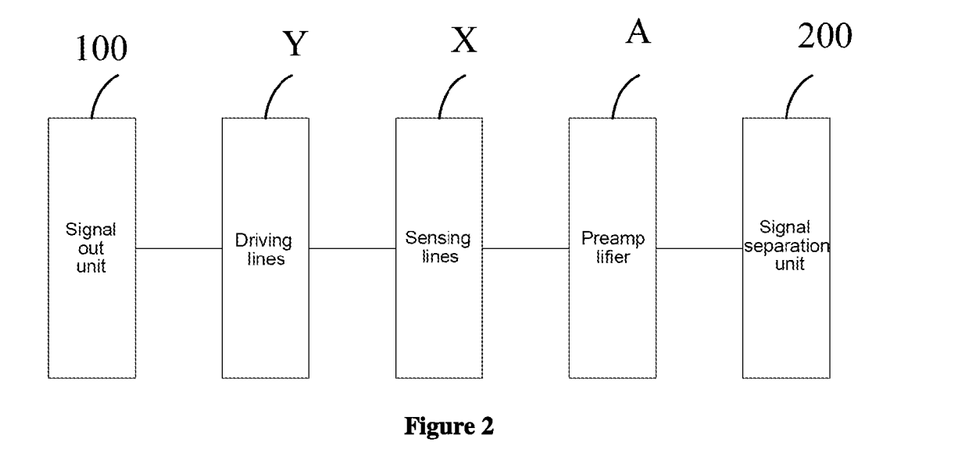
FIG. 2 is a schematic view of a mutual capacitive touch panel according to an embodiment of the present invention.

Referring to FIG. 2, which shows a schematic view of a mutual capacitive touch panel according to an embodiment of the present invention.

The mutual capacitive touch panel provided in the present embodiment includes: a plurality of driving lines Y, a plurality of sensing lines X intersecting with the driving lines, a preamplifier A, a signal output unit 100 and a signal separation unit 200.

The signal output unit 100, which is disposed at an input end of the driving lines Y, is configured to simultaneously output driving signals with different frequencies to all the driving lines Y.

The preamplifier A, which is disposed at an output end of the sensing lines X, is configured to capture sensing signals in the sensing lines X, and amplify and then output the sensing signals to the signal separation unit 200.

The signal separation unit 200, which is connected to the preamplifier A, is configured to separate the sensing signals with different frequencies and obtain addresses of the driving lines Y corresponding to the sensing signals, respectively.

In the mutual capacitive touch panel provided in the present embodiment, the driving signals with different frequencies are outputted by the signal output unit 100 to each of the driving lines Y, respectively, instead of outputting driving signals with a specific frequency to the input ends of the driving lines one by one in the prior art. In the case of a large number of the driving lines Y, the driving signals with different frequencies can be simultaneously sent by the signal output unit 100 to the different driving lines Y, respectively, and the sensing signals are eventually separated by the signal separation unit 200 to further identify the specific positions of the sensing signals, so that the driving line that sends the driving signal inducing the sensing signals can be determined However, the driving signals are required to be sent one by one in the prior art, which causes not only time delays but also the complicated control, because the driving lines Y are required to be connected and conducted one by one to send the driving signals. The touch panel provided in the present embodiment has simple circuitry and is convenient to control. Since the frequency of the driving signal outputted to each of the driving lines is different from the frequencies of the driving signals outputted to the other of the driving lines, the driving signals in the driving lines are not interfered by each other.

It is noted that only one signal output unit 100 is provided in the embodiment of the present invention to output the driving signals with different frequencies for all the driving lines Y.

Alternatively, a plurality of the signal output units 100 may be provided in the embodiment of the present invention to output the driving signals with different frequencies to the corresponding driving lines Y. For example, a first signal output unit is configured to output driving signals to the first to the Mth driving lines, and a second signal output unit is configured to output driving signals to the (M+1)th to the Nth driving lines, wherein M and N are integers and M<N. Of course, it is also possible that each of the signal output units corresponds to each of the driving lines.

It is noted that the signal output unit 100 may be a signal generator. The driving signals with different frequencies can be generated by the signal generator with configured parameters.

Figure 3:
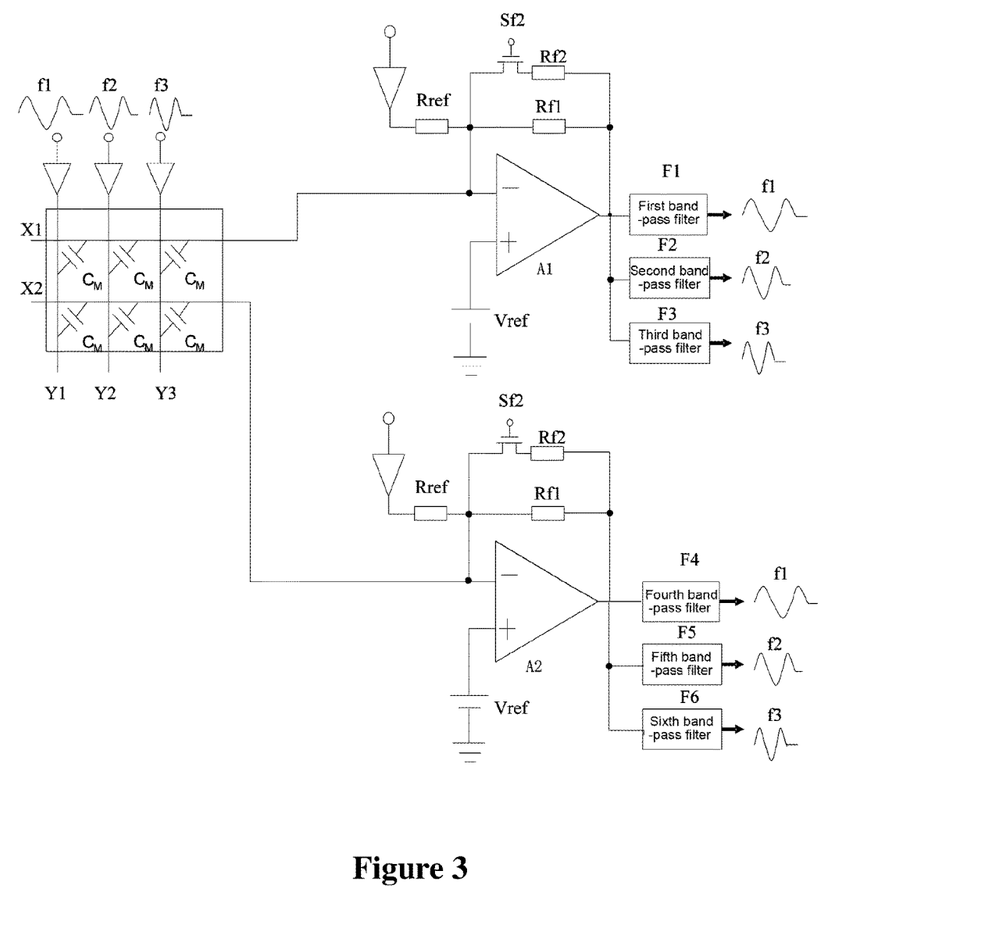
FIG. 3 is a circuit diagram of the mutual capacitive touch panel according to another embodiment of the present invention.

Reference is now made to FIG. 3, which shows a circuit diagram of the mutual capacitive touch panel according to a second embodiment of the present invention.

In the mutual capacitive touch panel provided in this embodiment, the output end of each of the sensing lines X is connected to a preamplifier A.

As shown in FIG. 3, the present embodiment is described by an example with three driving lines Y1, Y2 and Y3 and two sensing lines X1 and X2.

As can be seen from FIG. 3, the output end of each of the sensing lines is connected to a preamplifier. For example, the output end of a sensing line X1 is connected to a first preamplifier A1 and the output end of a sensing line X2 is connected to a second preamplifier A2.

It is noted that, in the present embodiment, the preamplifier further includes a feedback network, and the feedback network includes at least two feedback branches connected in parallel, where one of the feedback branches includes a resistor and the other of the feedback branches includes a resistor and a switch connected in series, and the resistance of the feedback network may be changed by controlling the on and off of the switch.

The first preamplifier A1 is taken as an example for describing below. Referring to FIG. 3, the feedback network in the first preamplifier A1 includes two feedback branches, a first feedback branch of which includes a first resistor Rf1, while a second feedback branch of which includes a second resistor Rf2 and a first switch Sf2 connected in series. When the first switch Sf2 is closed, the feedback network includes two resistors connected in parallel (i.e. the first resistor Rf1 and the second resistor Rf2); and when the first switch Sf2 is off, the feedback network includes the first resistor Rf1. That is, the resistance of the feedback network is changed by controlling the on and off of the first switch Sf2.

The preamplifier further includes a compensation network containing a compensation resistor Rref, and an inverting input terminal of the preamplifier is connected to a compensation signal source via the compensation resistor Rref.

The function of the compensation network is to compensate the output signal of the preamplifier when no signal is outputted by the sensing lines of the touch panel, so as to prevent the output terminal of the preamplifier from outputting a signal which leads to incorrect identification of the existence of a sensing signal in the touch panel.

The feedback network of the second preamplifier A2 is as same as that of the first preamplifier A1, and thus will not be described in detail herein.

In this embodiment, a positive phase input terminal of the preamplifier is connected to a bias voltage Vref and the inverting input terminal of the preamplifier is connected to the output end of the corresponding sensing line.

It is noted that the signal separation unit 200 may be a band-pass filter, through which the signals of frequencies corresponding to the driving signals are allowed to pass through, but signals of other frequencies are filtered out by the band-pass filter.

The number of the band-pass filters connected to the output end of each of the preamplifiers is equal to that of the driving lines. As shown in FIG. 3, the band-pass filters connected to the output end of the first preamplifier A1 include a first band-pass filter F1, a second band-pass filter F2 and a third band-pass filter F3. The band-pass filters connected to the output end of the second preamplifier A2 include a fourth band-pass filter F4, a fifth band-pass filter F5 and a sixth band-pass filter F6.

Figure 4:
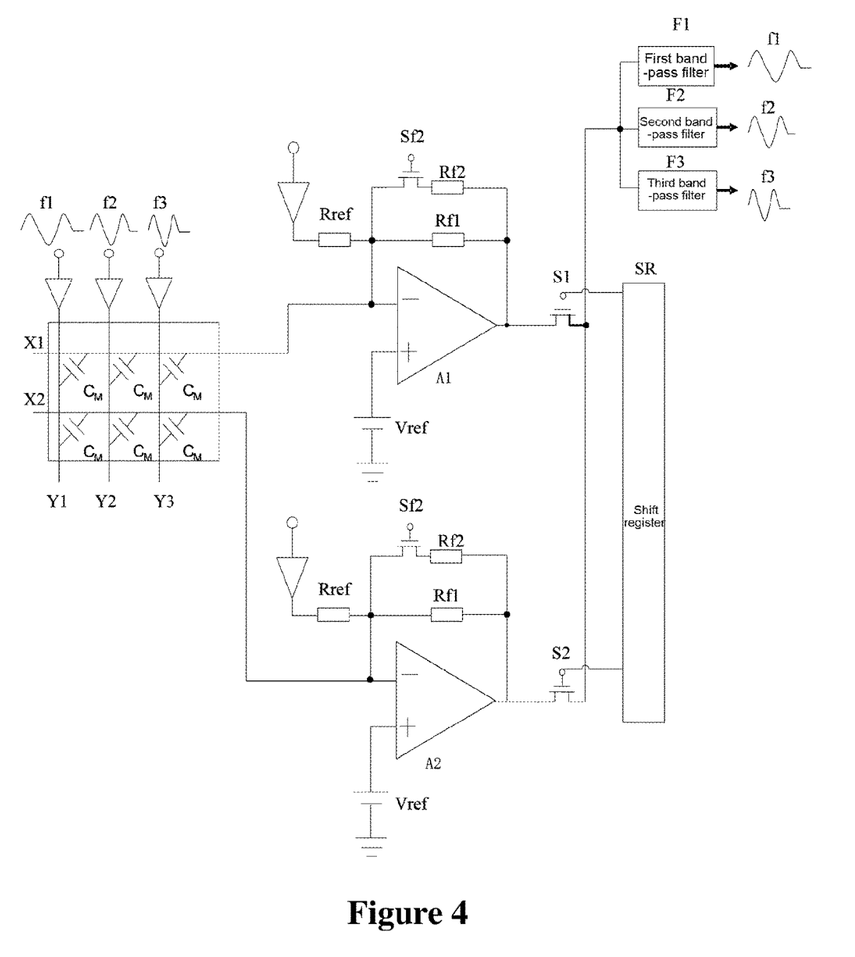
FIG. 4 is a circuit diagram of the mutual capacitive touch panel according to another embodiment of the present invention.

As can be seen from FIG. 3, the output end of each of the sensing lines is connected to one preamplifier, and the circuitry structure will become very complicated in the case of a large number of sensing lines. An embodiment is further provided to decrease the complexity of the circuitry structure. Reference is made below to FIG. 4, which is a circuit diagram of the mutual capacitive touch panel according to a third embodiment of the present invention.

As compared with the second embodiment, all the output terminals of preamplifiers connected to the sensing lines are connected to a shift register through selection switches in the present embodiment, thereby reducing the number of the band-pass filters, where the number of the selection switches is equal to that of the sensing lines.

As shown in FIG. 4, in the present embodiment, there are three driving lines Y1, Y2 and Y3, two sensing lines X1 and X2, a first preamplifier A1 and a second preamplifier A2 that are connected to the output ends of the sensing lines, a first selection switch S1 and a second selection switch S2 respectively connected in series with output terminals of the preamplifiers, and a shift register SR.

An output signal of the shift register SR is provided to a control gate of each of the selection switches, e.g., to the control gates of both of the first selection switch S1 and the second selection switch S2 as shown in FIG. 4; and, the sensing signals from the sensing lines X1 and X2 are amplified by the corresponding preamplifier, and then the amplified sensing signals are selected by the shift register SR by controlling the turning on or off of the first selection switch S1 and the second selection switch S2. The phases of the pulse signals outputted by the shift register SR are delayed sequentially by a predetermined cycle, the selection switches are selectively turned on sequentially, thus the sensing signals from the sensing lines pass through only one set of band-pass filters F1, F2 and F3, that is, signals with different frequencies from the driving lines Y1, Y2 and Y3 are separated by the single set of band-pass filters F1, F2 and F3. Therefore, those three band-pass filters F4, F5 and F6 corresponding to the preamplifier A2 in FIG. 3 are omitted. In other words, only one set of band-pass filters are required for detecting the touch position, thereby reducing the complexity of the circuit, decreasing the control difficulty and saving the cost.

Figure 5:
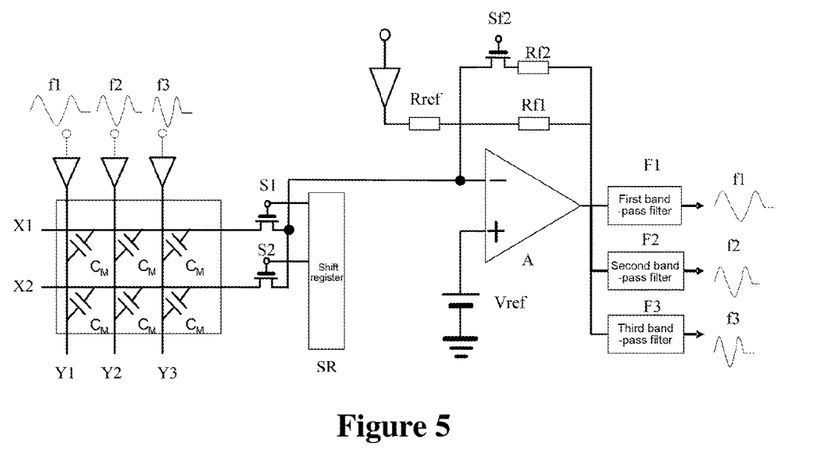
FIG. 5 is a circuit diagram of the mutual capacitive touch panel according to another embodiment of the present invention.

An embodiment of the present invention is further provided to further decrease the complexity of the circuitry structure. Reference is now made to FIG. 5, which is a circuit diagram of the mutual capacitive touch panel according to a fourth embodiment of the present invention.

A shift register SR is added to the output ends of the sensing lines in this embodiment such that the output ends of all the sensing lines are connected to the same preamplifier, and the number of band-pass filters is reduced as well.

As shown in FIG. 5, the touch panel provided in this embodiment further includes a shift register SR and selection switches, where the number of the selection switches is equal to that of the sensing lines. Two sensing lines X1 and X2 are present in the present embodiment, thus there are two selection switches corresponding to the sensing lines X1 and X2, i.e. a first selection switch S1 and a second selection switch S2, but there is only one preamplifier, i.e. the preamplifier A as shown in FIG. 5.

An output end of each of the sensing lines is connected to one selection switch in series. As shown in FIG. 5, the output end of the sensing line X1 is connected to the first selection switch S1 in series, and the output end of the sensing line X2 is connected to the second selection switch S2 in series.

An output signal of the shift register SR is provided to a control gate of each of the selection switches, e.g., to control gates of both of the first selection switch S1 and the second selection switch S2 as shown in FIG. 5. Sensing signals outputted by the sensing line X1 or X2 is selected by the shift register SR through controlling the turning on and off of the first selection switch S1 and the second selection switch S2. The sensing signals outputted by the sensing lines X1 and X2 are inputted to the inverting input terminal of the preamplifier A, while the positive phase input terminal of the preamplifier A is connected to a bias voltage Vref.

The phases of the pulse signals outputted by the shift register SR are delayed sequentially by a predetermined cycle, so that the selection switches are sequentially turned on selectively, to output the signals from the sensing lines to the inverting input terminal of the preamplifier. Therefore, the number of the preamplifier can be decreased, that is, only one preamplifier is provided for the output ends of all the sensing lines, thereby greatly reducing the complexity of the circuit as well as the control difficulty, and saving the cost.

Similarly, since the number of the preamplifiers is decreased, the number of band-pass filters connected to the output terminal of the preamplifier is decreased accordingly.

It is noted that, in the mutual capacitive touch panel provided in this embodiment, the end of each sensing line, from which the sensing signal is outputted, is connected to a first end of the selection switch by a via hole disposed on the thin film transistor substrate or a conductive gold spacer, and the second ends of all the selection switches are connected to the input terminal of the preamplifier.

The principle of the present embodiment will be described as follows in conjunction with FIG. 5.

For example, a frequency f1 of the driving signal in a first column of driving line is 50 kHz;

a frequency f2 of the driving signal in a second column of driving line is 60 kHz; and a frequency f3 of the driving signal in a third column of driving line is 70 kHz.

After the signals are separated by the band-pass filter, it can be concluded that a specific position on the second column of the driving line Y2 is touched if the amplitude of a signal with a frequency of 60 kHz is changed.

If the signal of the sensing line is from the second selection switch S2, it can be concluded that the second row of the sensing line X2 is touched. Therefore, it is determined that coordinates of the specific position touched by the user's finger is (2, 2).

In the technical scheme above, the signal output unit 100 simultaneously outputs driving signals with different frequencies to all the driving lines Y, with each of the driving lines Y receiving a driving signal with a fixed frequency, so that the signal separation unit 200 can acquire the addresses of the sensing lines X and the driving lines Y corresponding to the touch position, when a sensing signal with a certain frequency from the sensing lines obtained by the signal separation unit 200 is changed.

To ensure that the signal separation unit 200 can distinguish the sensing signals with different frequencies, and to reduce the mutual interference of the driving signals with different frequencies, the frequencies difference between the input frequency of each driving line and the input frequency of other driving lines must be greater or equal to the minimum frequency difference Δf (e.g. 1 KHz to 100 KHz). In the case that the area of the mutual capacitive touch panel is changed larger, or the mutual capacitive touch panel with a fixed area has higher resolution, the increased number of the driving lines Y and the increased number of the sensing lines X would occur, for example, from 40 (the number of the driving lines Y)*40 (the number of the sensing lines X) to 400 (the number of the driving lines Y)*400 (the number of the sensing lines X). The increased number of the driving lines and sensing lines need the driving signals with wider frequency domain for outputting. For example, the frequency of the driving signal of the first column of driving lines Y1 is 5 MHz, the frequency of the driving signal of the second of column diving lines Y2 is 5.01 MHz, the frequency of the driving signal of the 100th column of diving lines Y100 is 6 MHz, the frequency of the driving signal of the 400th column of diving lines Y400 is 9 MHz. Consequently, the width of the frequency domain of the driving signals outputted by the signal output unit 100 is 5 MHz-9 MHz. The circuitry within the mutual capacitive touch panel is substantially a resistor-capacitance (RC) network, and therefore the delay and the twist effect of the driving signals with different frequencies caused by the time constant inherent in the circuit are different, so that the outputted sensing signals generated by the coupling of the first column of driving lines Y1 and each of the sensing lines X are much different from the outputted sensing signals generated by the coupling of the 400th column of driving lines Y400 and each of the sensing lines X, thereby affecting the response uniformity of the signals of the mutual capacitive touch panel when being touched.

In order to solve above problem and obtain a wider frequency response property, the signal output unit may change the frequency of the driving signal to each of the columns of the driving lines every predetermined time interval in the above embodiments of the present invention. However, it is required that the frequency of the driving signal added to each of the columns of the driving lines is sufficiently different from the frequency of the driving signal added to any other column of the driving line, thus the signals with different frequencies can be separated subsequently by the band-pass filter without interference and crosstalk caused by signals of other columns.

Specifically, in the embodiment of the present invention, the signal output unit determines the sequence of the frequencies of the driving signals every the first predetermined time interval based on the hopping rule, and changes the frequency of the driving signal of each of the columns of the driving lines according the frequency sequence result.

In the embodiment of the present invention, many specific methods are provided to achieve the changing of the frequency of the driving signal of each of the columns of the driving lines, as long as it is ensured that for the driving signal of each column of the driving lines, the frequency of the driving signal before hopping is different from that after hopping. The alternative frequency hopping driving schemes will be described in detail hereinafter.

Figure 6:
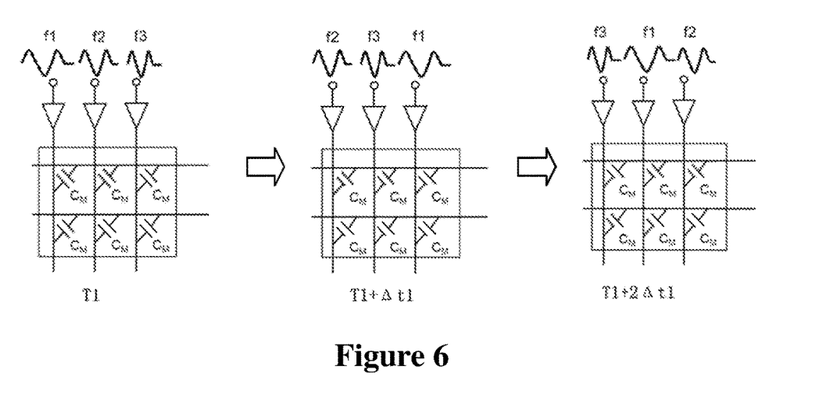
FIG. 6 is a schematic view showing hopping of the frequencies of the driving signals according to an embodiment of the present invention.

FIG. 6 is a schematic view showing hopping of the frequencies of the driving signals according to an anther embodiment of the present invention. Three driving lines Y1, Y2 and Y3 and two sensing lines X1 and X2 are illustratively shown in the present embodiment. As shown in FIG. 6, at the time T1, the driving signal with the frequency f1 is outputted to the first column driving line Y1 from the signal output unit 100, the driving signal with the frequency f2 is outputted to the second column driving line Y2 from the signal output unit 100, and the driving signal with the frequency f3 is outputted to the third column driving line Y3 from the signal output unit 100. After the first predetermined time interval Δt1 (that is, at the time T1+Δt1), the driving signal with the frequency f2 is outputted to the first column driving line Y1 from the signal output unit 100, the driving signal with the frequency f3 is outputted to the second column driving line Y2 from the signal output unit 100, and the driving signal with the frequency f1 is outputted to the third column driving line Y3 from the signal output unit 100. Then, after the first predetermined time interval Δt1 (that is, at the time T1+2Δt1), the driving signal with the frequency f3 is outputted to the first column driving line Y1 from the signal output unit 100, the driving signal with the frequency f1 is outputted to the second column driving line Y2 from the signal output unit 100, and the driving signal with the frequency f2 is outputted to the third column driving line Y3 from the signal output unit 100. Namely, the signal output unit 100 successively exchanges the current frequencies of the driving signals on two adjacent driving lines every the first predetermined time interval Δt1, and determines the sequence of the frequencies of the driving signals, and changes (i.e., hops) the frequency of the driving signal on each column driving line based on the sequence result (that is, the determined sequence) of the frequency. The above-mentioned sequence result of the frequencies is: f1, f2, f3; f2, f3, f1; and f3, f1, f2, where the f1, f2, f3 may be in an increasing sequence, a decreasing sequence or a random sequence.

Although in the above embodiment, the frequency of the driving signal for a single driving line is single, the frequency difference of the driving signal on the driving line is averaged after multiple successively hopping driving, so that the non-uniformity on the spatial between the first column of driving lines and the last column of driving lines is eliminated, thus solving the problem of the non-uniform response of the signals of the mutual capacitive touch panel when being touched.

Figure 7:
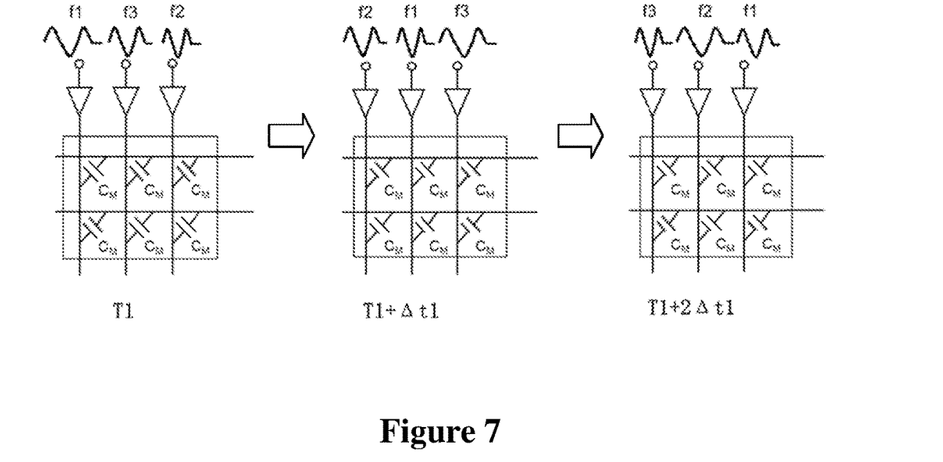
FIG. 7 is a schematic view showing hopping of the frequencies of the driving signals according to another embodiment of the present invention.

FIG. 7 is a schematic view showing hopping of the frequencies of the driving signals according to anther embodiment of the present invention. As shown in FIG. 7, the signal output unit randomly changes the frequency sequence of the driving signals every the first predetermined time interval Δt1, and changes the frequency of the signal for each driving line based on the randomly-changed frequency sequence of the driving signals. The sequence result of the frequencies in FIG. 7 is: f1, f3, f2; f1, f3, f3; f1, f2, f3. Specifically, at the time T1, the driving signal with the frequency f1 is outputted to the first column driving line Y1 from the signal output unit 100, the driving signal with the frequency f3 is outputted to the second column driving line Y2 from the signal output unit 100, the driving signal with the frequency f2 is outputted to the third column driving line Y3 from the signal output unit 100. After one first predetermined time interval Δt1 (that is, at the time T1+Δt1), the driving signal with the frequency f2 is outputted to the first column driving line Y1 from the signal output unit 100, the driving signal with the frequency f1 is outputted to the second column driving line Y2 from the signal output unit 100, and the driving signal with the frequency f3 is outputted to the third column driving line Y3 from the signal output unit 100; Then, after another first predetermined time interval Δt1 (that is, at the time T1+2Δt1), the driving signal with the frequency f1 is outputted to the first column driving line Y1 by the signal output unit 100, the driving signal with the frequency f2 is outputted to the second column driving line Y2 from the signal output unit 100, and the driving signal with the frequency f3 is outputted to the third column driving line Y3 from the signal output unit 100.

Another method for hopping the frequency of the driving signal is also provided in an embodiment of the present invention. Specifically, the signal output unit queries a predetermined address code every the first predetermined time interval, and determines the sequence of the frequencies of the outputted driving signals according to the corresponding hopping rule based in the predetermined address code; and changes the frequency of the driving signal on each of the columns of the driving lines according to the sequence result of the frequencies.

Optionally, the predetermined address code may be defined in advance, or may be generated in a random and real-time update, as long as the signal output unit re-assigns the frequency hopping of the driving signals on each column of driving lines according to the predetermined address code so as to ensure that the frequency of driving signal on each column of driving lines after the hopping is different from that before the hopping.

The hopping rule, which defines the correspondence relationship between the frequencies of the driving signals and the addresses of the driving lines in each hopping, is stored in the predetermined address code. The signal output unit queries the predetermined address code every the first predetermined time interval, and determines the sequence of the frequencies of the driving signals according to the current hopping rule in the predetermined address code.

Figure 8:
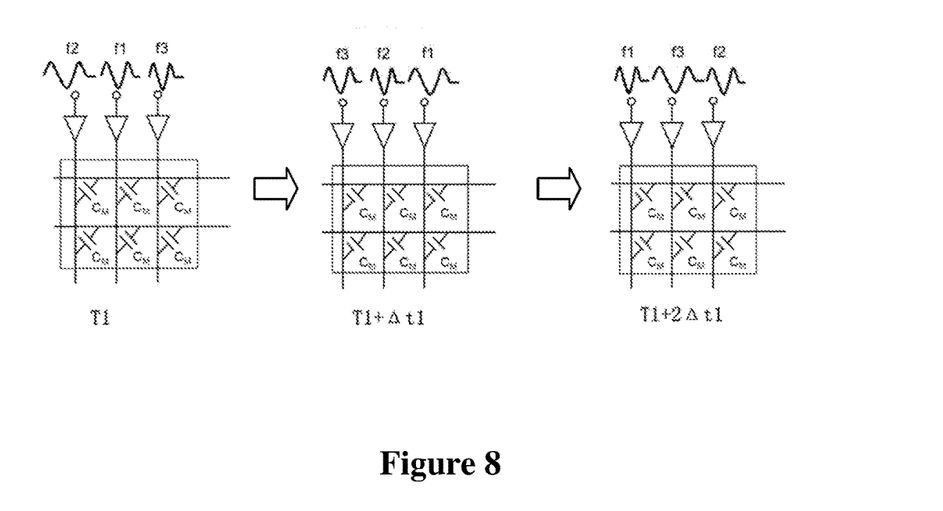
FIG. 8 is a schematic view showing hopping of the frequencies of the driving signals according to another embodiment of the present invention.

FIG. 8 is a schematic view showing hopping of the frequencies of the driving signals hopping according to an anther embodiment of the present invention. As shown in FIG. 8, at the time T1, the frequencies of the driving signals corresponding to the first column driving line Y1, the second column driving line Y2 and the third column driving line Y3 are f2, f1 and f3, respectively. After one first predetermined time interval Δt1 (that is, at the time T1+Δt1), the signal output unit queries the predetermined address code and determines the current frequencies of the driving signals corresponding to the first column driving line Y1, the second column driving line Y2 and the third column driving line Y3 as f3, f2 and f1, respectively. Accordingly, the frequencies of the driving signals corresponding to the first column driving line Y1, the second column driving line Y2 and the third column driving line Y3 are changed from f2, f1 and f3 to f3, f2 and f1, respectively. After another first predetermined time interval Δt1 (that is, at the time T1+2Δt1), the signal output unit queries the predetermined address code and determines the current frequencies of the driving signals corresponding to the first column driving line Y1, the second column driving line Y2 and the third column driving line Y3 as f1, f3 and f2, respectively. Accordingly, the frequencies of the driving signals corresponding to the first column driving line Y1, the second column driving line Y2 and the third column driving line Y3 are changed from f3, f2 and f1 to f1, f3 and f2, respectively.

Optionally, the signal output unit may update the hopping rule stored in the predetermined address code every the second predetermined time interval Δt2.

As can be seen, the embodiments described above are preferable but not intended to limit the present invention in any way. Although the present invention has been described as above in combination with the preferable embodiments, the invention is not limited to these embodiments. Various modifications and variations may be made on the technical solutions of the present invention by those skilled in the art in light of the methods and other technical contents described above without departing from the scope of the invention, or equivalent embodiments with equivalent modifications may be obtained. Thus, any simple modifications, equivalent variations and modifications made to the embodiments based on the essence of the technical solution without departing the scope of the technical solutions of the present invention are intended to fall within the scope of this invention.

What is claimed is:
1. A mutual capacitive touch panel, comprising:
a plurality of driving lines;
a plurality of sensing lines intersecting with the plurality of driving lines;
a preamplifier;
a signal output unit; and
a signal separation unit;
wherein the signal output unit is disposed at input ends of the driving lines and is configured to simultaneously output driving signals to all the driving lines, wherein each of driving signals has a different frequency and is output to a different one of the driving lines respectively;
wherein the preamplifier is disposed at output ends of the plurality of sensing lines and is configured to capture sensing signals from the plurality of sensing lines, amplify the sensing signals and output the amplified sensing signals to the signal separation unit;

wherein the signal separation unit is connected to the preamplifier and is configured to separate the sensing signals with different frequencies and obtain addresses of the plurality of driving lines associated with each of the sensing signals;

wherein the signal output unit determines a frequency sequence every a first predetermined time interval based on a hopping rule, and changes a frequency of a driving signal of each of the driving lines based on the determined frequency sequence, wherein the frequency sequence comprises frequencies of the driving signals;

wherein the mutual capacitive touch panel further comprises a shift register and selection switches, wherein a number of the selection switches is equal to a number of the plurality of sensing lines;

wherein an output end of each of the plurality of sensing lines is connected with one of the selection switches in series, an output signal of the shift register is provided to a control gate of each of the selection switches so that a sensing signal outputted by one sensing line of the plurality of sensing lines is selected by the shift register through controlling turning on and off of the selection switches, the sensing signal outputted from the plurality of sensing lines is inputted to an inverting input terminal of the preamplifier, and wherein a positive phase input terminal of the preamplifier is connected to a bias voltage.

2. The mutual capacitive touch panel of claim 1, wherein the signal output unit randomly changes the frequency sequence of the driving signals every the first predetermined time interval, and changes the frequency of the driving signal of each of the columns of the driving lines according to the randomly-changed frequency sequence of the driving signals.

3. The mutual capacitive touch panel of claim 1, wherein the signal output unit changes the frequency sequence by successively exchanging the current frequencies of the driving signals associated with two adjacent driving lines every the first predetermined time interval, and changes the frequency of the driving signal of each of the columns of the driving lines according to the changed frequency sequence of the driving signals.

4. The mutual capacitive touch panel of claim 1, wherein the signal output unit queries a predetermined address code every the first predetermined time interval, determines the frequency sequence according to the hopping rule in the predetermined address code; and changes the frequency of the driving signal of each of the columns of the driving lines according to the determined frequencies sequence.

5. The mutual capacitive touch panel of claim 4, wherein the predetermined address code is updatable.

6. The mutual capacitive touch panel of claim 1, wherein, a positive phase input terminal of the preamplifier is connected to a bias voltage, and an inverting input terminal of the preamplifier is connected to an output end of the associated sensing line of the plurality of sensing lines.

7. The mutual capacitive touch panel of claim 1, wherein, from an end of each sensing line the sensing signal is outputted, and the end of each sensing line is connected to a first end of the selection switch by a via hole disposed on a thin film transistor substrate or a conductive gold spacer, and second ends of all the selection switches are connected to the inverting input terminal of the preamplifier.

8. The mutual capacitive touch panel of claim 1, wherein, the signal output unit is single and is configured to output the driving signals with different frequencies to the plurality of driving lines respectively; or a plurality of the signal output units are present and each of the signal output units is configured to output driving signals with different frequencies to each of the associated driving lines.

9. The mutual capacitive touch panel of claim 1, wherein, the preamplifier further comprises a feedback network containing at least two feedback branches connected in parallel, wherein one of the feedback branches comprises a resistor and the other of the feedback branches comprises a resistor and a switch connected in series, and the resistance of the feedback network is changed by controlling the turning on and off of the switches.

10. The mutual capacitive touch panel of claim 9, wherein, the preamplifier further comprises a compensation network containing a compensation resistor, and the inverting input terminal of the preamplifier is connected to a compensation signal source through the compensation resistor.

11. The mutual capacitive touch panel of claim 1, wherein, the signal separation unit comprises a plurality of band-pass filters, and a number of the plurality of band-pass filters connected to the output terminal of the preamplifier is equal to a number of the plurality of driving lines.

12. The mutual capacitive touch panel of claim 1, wherein, the signal output unit is a signal generator.

13. A mutual capacitive touch panel, comprising:
a plurality of driving lines;
a plurality of sensing lines intersecting with the plurality of driving lines;
at least one preamplifier;
a signal output unit; and
a signal separation unit;
wherein the signal output unit is disposed at input ends of the plurality of driving lines and is configured to simultaneously output driving signals to all the driving lines, wherein each of the driving signals has a different frequency and is output to a different one of the plurality of driving lines respectively;
wherein the preamplifier is disposed at output ends of the plurality of sensing lines and is configured to capture sensing signals from the plurality of sensing lines, and amplify the sensing signals and output the amplified sensing signals to the signal separation unit;
wherein the signal separation unit is connected to the preamplifier and is configured to separate the sensing signals with different frequencies, and to obtain addresses of the plurality of driving lines associated with each of the sensing signals;
wherein the signal output unit determines a frequency sequence every a first predetermined time interval based on a hopping rule, and changes a frequency of a driving signal of each of the plurality of driving lines based on the determined frequency sequence, wherein the frequency sequence comprises frequencies of the driving signals;
wherein an output end of each sensing line of the plurality of sensing lines is connected to the at least one preamplifier;
wherein the mutual capacitive touch panel further comprises a shift register and selection switches, wherein a number of the selection switches is equal to a number of the plurality of sensing lines;

wherein an output terminal of each of the at least one preamplifier is connected to a first end of one of the selection switches, and a second end of each of the selection switches is connected to the signal separation unit; and wherein an output signal of the shift register is provided to a control gate of each of the selection switches.

* * * * *